United States Patent
Goto et al.

(10) Patent No.: US 9,961,924 B2
(45) Date of Patent: May 8, 2018

(54) FEED FOR FISH FARMING

(75) Inventors: Tsuyoshi Goto, Tokyo (JP); Yasuhiro Fukuda, Tokyo (JP); Itaru Shioya, Tokyo (JP); Hideki Nikaido, Kagoshima (JP); Yosuke Tanaka, Kagoshima (JP); Taeko Kousaka, Tokyo (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 608 days.

(21) Appl. No.: 13/260,117

(22) PCT Filed: Mar. 24, 2010

(86) PCT No.: PCT/JP2010/055103
§ 371 (c)(1),
(2), (4) Date: Dec. 9, 2011

(87) PCT Pub. No.: WO2010/110326
PCT Pub. Date: Sep. 30, 2010

(65) Prior Publication Data
US 2012/0076897 A1 Mar. 29, 2012

(30) Foreign Application Priority Data
Mar. 25, 2009 (JP) .................. 2009-073243

(51) Int. Cl.
*A23K 1/18* (2006.01)
*A23K 50/80* (2016.01)
(Continued)

(52) U.S. Cl.
CPC ............ *A23K 50/80* (2016.05); *A23K 20/158* (2016.05); *A23K 40/30* (2016.05); *Y02A 40/818* (2018.01)

(58) Field of Classification Search
None
See application file for complete search history.

(56) References Cited

U.S. PATENT DOCUMENTS

| | | | |
|---|---|---|---|
| 4,579,741 A | * | 4/1986 | Hanson et al. .................. 426/92 |
| 5,773,051 A | * | 6/1998 | Kim .................................. 426/1 |
| 6,830,771 B2 | * | 12/2004 | Lanter et al. ................. 426/573 |

FOREIGN PATENT DOCUMENTS

| | | |
|---|---|---|
| AU | 2006216144 | 8/2006 |
| CN | 1579207 | 2/2005 |

(Continued)

OTHER PUBLICATIONS

Takahashi et al. WO 2006090866 Japanese Machine Translation 18 pages.*

(Continued)

*Primary Examiner* — Felicia C Turner
(74) *Attorney, Agent, or Firm* — Hamre, Schumann, Mueller & Larson, P.C.

(57) ABSTRACT

This invention provides a feed for fish farming which is excellent in terms of stability of feed supply and feed shelf life and which has excellent feed intake and feed efficiency. The feed for fish farming has an outer layer and an inner layer, characterized in that a composition constituting the outer layer has a breaking stress of $5 \times 10^4$ to $1 \times 10^6$ N/m², a cohesiveness (30%) of 0.4 to 1.0, and a breaking strain of 30 to 80%. The feed for fish farming is characterized by having an outer layer constructed from a heat-induced gel which comprises a protein and/or a starch, and an inner layer comprising a composition which contains nutrient ingredients having fish meal and an oil as essential ingredients.

16 Claims, 1 Drawing Sheet

(51) Int. Cl.
*A23K 40/30* (2016.01)
*A23K 20/158* (2016.01)

(56) References Cited

FOREIGN PATENT DOCUMENTS

| | | | | |
|---|---|---|---|---|
| EP | 1527700 | * | 5/2005 | ............ A23K 1/16 |
| JP | 60-153764 | | 8/1985 | |
| JP | 63-143179 | | 9/1988 | |
| JP | 63-143179 U | | 9/1988 | |
| JP | 6-319467 | | 11/1994 | |
| JP | 8-280333 | | 10/1996 | |
| JP | 2004-097064 | | 4/2004 | |
| JP | 2005-027613 | | 2/2005 | |
| JP | 2007-104938 | | 4/2007 | |
| JP | 2008-086274 | | 4/2008 | |
| WO | WO 97/22265 | * | 6/1997 | ............ A23K 1/18 |
| WO | 2006/090866 | | 8/2006 | |
| WO | WO 2006098629 | * | 9/2006 | ............ A23K 1/18 |

OTHER PUBLICATIONS

Han, et al., "Process and Storage of Feed", Journal of Nei Jiang Science & Technology, No. 4, p. 23, Aug. 31, 2001 (1 page), No English Abstract.

Autin, "Commercial aquafeed manufacture and production", Feeding Tomorrow's Fish, 1997, pp. 79-104 https://om.ciheam.org/om/pdf/c22/97605915.pdf.

* cited by examiner

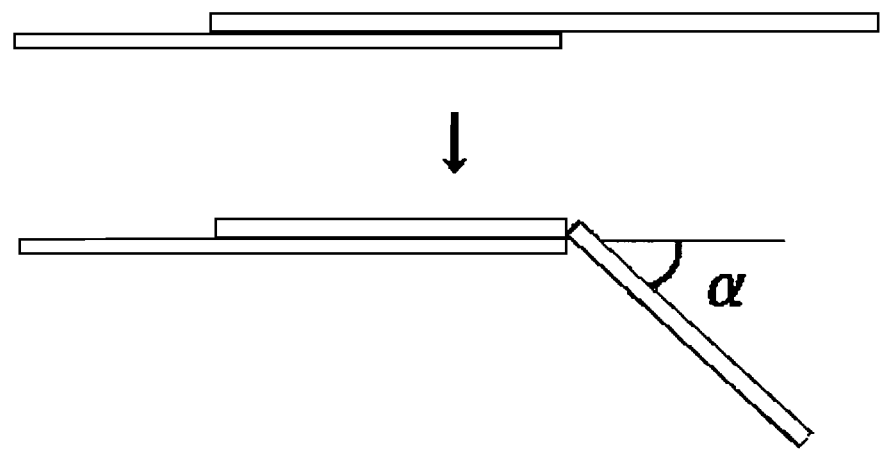

FEED FOR FISH FARMING

TECHNICAL FIELD

The present invention relates to a feed for fish farming for raising farmed fish, and more specifically relates to a feed for fish farming suitable for farming tuna.

BACKGROUND ART

What first comes to mind as feed for fish farming is raw bait that is also consumed as bait in the natural world (fresh or frozen horse mackerel, mackerel, sardines, sand eels, squid, and the like). Raw bait is originally natural bait for fish, and is therefore excellent in terms of being preferred by fish and the nutritional benefits for fish, but suffers from problems such as stable supply and stable product quality due to being derived from natural resources. Moist pellets, which are obtained by blending vitamins, minerals, natural starches, and the like with raw bait, are superior in terms of nutritional benefits for fish and stability of supply, but problems of environmental pollution caused by moist pellets being discharged into marine environments rather than being consumed by fish have been pointed out. In addition, the use of these feeds involves drawbacks such as storage facility costs due to the need for storage in freezers or refrigerators.

Solid fish farming feeds obtained by using only artificial feed raw materials and molding with a steam pelleter or extruder overcome these drawbacks and are advantageous in terms of stability of feed supply and feed shelf life. As a result, bait given to farmed fish is changing from raw bait to artificial feed in the fish farming industry. However, although switching to artificial feed is essential for lasting fish farming, the preference for raw bait is extremely high in highly carnivorous fish, meaning that switching to artificial feed is not easy for these fish types. For example, Pacific bluefin tuna, Thunnus orientalis, and Northern bluefin tuna. Thunnus thynnus, have an extremely strong preference for raw bait, but have an extremely low preference for artificial feed, meaning that there has been a delay in switching from raw bait to artificial feed for these species. In addition, the switch from raw bait to artificial feed is progressing for Yellowtail, Seriola quinqueradiata, and Greater amberjack, Seriola dumerili, but it is not yet easy to farm these fish using only artificial feed.

A variety of techniques have come to be used in the development of feeds that are acceptable to fish such as these tuna species. Patent document 1 is an invention that focuses on the size of feeds and relates to a method for efficiently producing samples of a size that is preferred by tuna species. In addition, patent document 2 discloses a feed having a certain softness, which is obtained by sealing feed raw materials in an edible film. Furthermore, patent document 3 discloses a feed which consists of a shell that includes a sticky material and a core that contains a nutrient ingredient and which is produced by using a filling-wrapping machine.

BACKGROUND ART DOCUMENTS

Patent Documents

[Patent document 1] Japanese Unexamined Patent Application Publication No. 2004-97064
[Patent document 2] Japanese Unexamined Patent Application Publication No. 2005-27613
[Patent document 3] WO 2006/090866

SUMMARY OF THE INVENTION

Problem to be Solved by the Invention

An object of the present invention is to provide a feed for fish farming which is excellent in terms of stability of feed supply and feed shelf life and which has high feed intake and excellent feed efficiency.

Means to Solve the Problem

The inventors of the present invention carried out a variety of investigations in order to develop a feed which is highly acceptable to tuna species and which has good growth properties. As a result, the inventors of the present invention learned that tuna species are extremely sensitive to the physical properties of feeds as well as the size and shape thereof, and prefer not just simple hardness, but also physical properties that combine resiliency and softness. The inventors of the present invention found physical properties preferred by tuna species by feeding tuna species with feeds having a variety of physical properties. Furthermore, by attempting to express these physical properties as objective numerical values, the inventors of the present invention found that it was possible to express preferred physical properties by combining numerical values referred to as "breaking stress", "cohesiveness", and "breaking strain". In addition, the inventors of the present invention found that a simple method for evaluating physical properties was a method that involves preparing a rectangular slice having a thickness of approximately 3 mm, bending this slice, and determining the angle at which cracks appear. It is possible to achieve preferred physical properties by using this type of indicator, and the present invention was completed through diligent research into how obtain a feed that also satisfies nutritional conditions that are essential as a feed for tuna species.

The gist of the present invention is the feed for fish farming in (1) to (13) below and the feed method in (14) below.

(1) A feed for fish farming including an outer layer and an inner layer (filling), characterized in that a composition constituting the outer layer has a breaking stress of $5 \times 10^4$ to $1 \times 10^6$ N/m$^2$, an cohesiveness (30%) of 0.4 to 1.0 and a breaking strain of 30 to 80%.

(2) The feed for fish farming described in (1), wherein the composition of the inner layer is a composition which contains nutrient ingredients having fish meal and fish oil as essential ingredients.

(3) The feed for fish farming described in (1), wherein a weight ratio of the compositions of the outer layer and inner layer is between 3:7 and 7:3.

(4) A feed for fish farming including an outer layer constructed from a heat-induced gel which includes a protein and/or a starch, and an inner layer including a composition which contains nutrient ingredients having fish meal and an oil as essential ingredients.

(5) The feed for fish farming described in (4), wherein the protein is one selected from among surimi (water-washed ground fish meat), ground fish meat, krill, gelatin, collagen, gluten, egg albumen, soy bean protein, or a combination of two or more types thereof.

(6) The feed for fish farming described in (4) or (5), wherein the starch is tapioca starch, wheat starch, potato starch, corn starch, bean starch, waxy corn starch, or a processed product of these starches.

(7) The feed for fish farming described in any one of (4) to (6), wherein the outer layer further contains fish meal and/or an oil.

(8) The feed for fish farming described in any one of (4) to (7), wherein a moisture of the outer layer is 25 to 35 wt. %.

(9) The feed for fish farming described in any one of (4) to (8), wherein the outer layer is a composition having physical properties whereby cracks do not occur when a rectangular slice having a thickness of 3 mm is produced, dried for 30 minutes at a temperature of 105° C., and then bent to an angle of at least 90° when folded in half.

(10) The feed for fish farming described in any one of (1) to (9), wherein the inner layer composition contains 30 to 70 wt. % of fish meal and 30 to 70 wt. % of an oil.

(11) The feed for fish farming described in any one of (1) to (10), wherein the inner layer composition further contains any of a polysaccharide, a hydrogenated oil, or an emulsifier.

(12) The feed for fish farming described in any one of (1) to (11), which is a feed for tuna species.

(13) A feed for fish farming, wherein moisture in an outer layer of the feed described in any one of (4) to (12) is adjusted to 10 to 20 wt. %.

(14) A method in which the feed described in (13) is immersed in a liquid so as to absorb water and then used.

The gist of the present invention is the method for producing a feed for fish farming in (15) to (22) below.

(15) A method for producing a feed for fish farming, including preparing an outer layer composition by adding a secondary raw material to a protein raw material and/or starch raw material that forms a gel upon heating and then blending by stirring, preparing an inner layer composition by blending fish meal, an oil, and another nutrient ingredient by stirring, forming so that at least a main surface of the inner layer composition is covered by the outer layer composition, and then heat treating so as to gel the outer layer composition.

(16) A method for producing a feed for fish farming, including preparing an outer layer composition by adding a secondary raw material to a protein raw material and/or starch raw material that forms a gel upon heating and then blending by stirring, preparing an inner layer composition by blending fish meal, an oil, and another nutrient ingredient by stirring, and extrusion molding with an extruder provided with a double nozzle so as to gel the outer layer composition by heat treatment while simultaneously covering at least a main surface of the inner layer composition.

(17) The method for producing a feed for fish farming described in (15) or (16), wherein the protein is one selected from among surimi, ground fish meat, krill, gelatin, collagen, gluten, egg albumen, soy bean protein, or a combination of two or more types thereof.

(18) The feed for fish farming described in any one of (15) to (17), wherein the starch raw material is one selected from among tapioca starch, wheat starch, potato starch, corn starch, bean starch, waxy corn starch, a processed product of these starches, or a combination of two or more types thereof.

(19) The method for producing a feed for fish farming described in any one of (15) to (18), wherein the secondary raw material added to the outer layer composition is one selected from among fish meal, an oil, a salt, a sugar, a sugar alcohol, glycerin, a polysaccharide thickener, or a combination of two or more thereof.

(20) The method for producing a feed for fish farming described in any one of (15) to (19), wherein the other nutrient ingredient contains a vitamin and/or a mineral.

(21) The method for producing a feed for fish farming described in any one of (15) to (20), wherein the inner layer composition contains 30 to 70 wt. % of fish meal and 30 to 70 wt. % of an oil.

(22) The method for producing a feed for fish farming described in any one of (15) and (21), wherein the inner layer composition further contains any of a polysaccharide, a hydrogenated oil, or an emulsifier.

Advantage of the Invention

The feed of the present invention has physical properties that are liked by tuna species and contains sufficient nutrition for the growth of tuna species. The feed of the present invention is a highly nutritional artificial feed which can be used instead of live (raw) bait and which is excellent in terms of stability of feed supply and feed shelf life and has excellent feed intake and feed efficiency.

BRIEF DESCRIPTION OF THE DRAWING

FIG. 1 is a diagram showing a method for measuring the physical properties of the outer layer described in test example 7.

MODE FOR CARRYING OUT THE INVENTION

Tuna species are extremely sensitive to the physical properties of feeds and a variety of feeds have been devised, but a feed which has similar feed intake to raw bait, which has a higher nutritional value per unit quantity than raw bait and which has good feed efficiency has not yet been perfected. Up to now, emphasis has been placed on the size and softness of feeds, but it has not been possible to obtain a feed having sufficient feed intake by adjusting the size and softness of feeds alone.

The inventors of the present application fed tuna species with foods having a variety of physical properties, as shown in test example 1, and found that, in terms of hardness, tuna species prefer not simply softness, but physical properties that combine resiliency and softness. In addition, after placing bait once in the mouth of a tuna species, it was understood that the behavior of the tuna species was to check the size and physical properties of the bait, dive into the water, and then swallow the bait. Therefore, it is not preferable for the bait to bend or disintegrate when given to the tuna species, and it is necessary for the bait to have a certain degree of strength while exhibiting elasticity and softness. It goes without saying that the bait must have sufficient strength to resist impacts when fed to the fish.

As a result of comparing the physical properties of feeds that are preferred by tuna species and feeds that are not preferred by tuna species in order to produce a feed having physical properties that are in line with the preferences of tuna species, it was clear that tuna species prefer feeds having physical properties that fall within certain ranges, that is, a breaking stress of $5 \times 10^4$ to $6 \times 10^5$ N/m$^2$, a cohesiveness (30%) of 0.4 to 0.6% and a breaking strain of 20 to 60% (physical properties of the overall feed). Live fish also fall within these ranges.

However, even if a feed satisfies these physical properties, if the quantity of nutrients contained in the feed is not sufficient for the growth of the tuna species, the feed can not be used as a feed for fish farming. Tuna species preferred physical properties such as those of kanikama (imitation crab sticks), but kanikama is inadequate as a feed for farming tuna species in terms of protein and fat content. A feed must have the preferred physical properties and must also contain at least certain quantities of fish meal and oils, which are essential as nutrients in a feed for fish farming.

The inventors of the present invention tried to prepare a feed by adding fish meal and oil to fish paste, but it was not possible to mold a paste to which the required quantities of fish meal and fat were added. As a result, it was realized that the present invention could not be obtained by blending fish meal and oil in a fish paste, but by covering fish paste with a substance able to form a gel.

In the present invention, breaking stress is a parameter that mainly reflects hardness. When a plunger having a fixed cross-sectional area (S) (mm$^2$) is used to apply pressure to a sample being measured and the load when the sample fractures is expressed as F (N), the breaking stress is expressed as F/S ($\times 10^{-6}$ N/m$^2$).

In the present invention, breaking strain is a parameter that relates to ease of cracking and brittleness. When measuring the breaking stress, the degree of deformation that the sample undergoes until fracture occurs at the fracture load F, that is, the breaking strain, is expressed as $\Delta H/H$ ($\times 100\%$) if the height of the sample is H (mm) and the distance that the plunger advances is $\Delta H$ (mm).

In the present invention, cohesiveness is a parameter that relates to elasticity and softness, and reflects the ability of a material to return to its original state after being deformed by the application of pressure. A plunger having a fixed cross-sectional area (S) (mm$^2$) is used to apply pressure to a sample being measured. Having reached a pre-set distance (clearance), the plunger is returned to its original position. This operation is repeated twice. The change over time of the size of the load is plotted on a chart, and expressed as the ratio of the area below the load curve for the first and second operations. The cohesiveness is expressed as $A_2/A_1$ ($A_1$: area under curve for first operation, $A_2$: area under curve for second operation).

The values for the parameters that express these physical properties vary to a certain extent depending on the measurement conditions, but values obtained by preparing cylinders having a diameter of 2.3 cm and a height of 2.0 cm from the composition in question and then measuring with the cylinder laid in a horizontal state are used in the present invention. The inventors tried to prepare samples of other shapes and sizes, but if the ingredients in the compositions were identical, changes of ±10% or more were not seen. In addition, in cases where compositions were not uniform, such as when using live fish, measurements were carried out using fish cut so as to have similar sizes and used as reference values.

As a result of testing a variety of physical properties for the outer layer, which is essential for producing a feed that is liked by the above-mentioned tuna species, it was possible to produce a feed having overall physical properties that are liked by tuna species by covering fish meal and oils with an outer layer having physical properties that fulfill "a breaking stress of $5 \times 10^4$ to $1 \times 10^6$ N/m$^2$, an cohesiveness (30%) of 0.4 to 1.0%, and a breaking strain 30 to 80%".

In the present invention, a heat-induced gel means a gel able to be formed by heating a protein to 60° C. or higher or by heating a protein to 60° C. or higher and then cooling, or a gel able to be formed by adding water to a starch and then heating to 60° C. or higher so as to cause gelatinization.

The composition of the outer layer may be any which has the above-mentioned physical properties and which covers the inner layer composition, but it was found that the physical properties of a gel able to be formed by heating a protein or a gel able to be formed by heating a starch is suitable for use in the present invention from the perspectives of softness, extensibility, and the like. For example, a protein having gel-forming properties is preferred, such as fish meat, surimi, hill, gluten, collagen, soy bean protein, enzymatically degraded soy bean protein, gelatin, egg albumen, or a combination of two or more types thereof. Preferred starches include tapioca starch, wheat starch, potato starch, corn starch, bean starch, waxy corn starch, or a processed product of these starches. It is possible to use food ingredients that contain large quantities of these proteins and/or starches. By heating an outer layer composition that contains these proteins and/or starches, the gel is immobilized, has flexibility, and also has power to hold the inner layer composition and a certain degree of strength.

For example, if surimi is used as the outer layer composition, this can be produced using a method for producing a fish paste product such as kamaboko (semi-cylindrical processed fish paste). Specifically, 2% or more of common salt is added to the surimi, which is left to stand for 10 minutes or longer at a temperature of 10° C. or higher, and preferably 30° C. to 40° C., and then heated for 10 minutes or longer at a temperature of 80° C. to 90° C. Alternatively, if egg albumen is used, egg albumen, starch, fish meal, and water are blended at a weight ratio of, for example, 1:1:2:6 and then heated, thereby producing a composition having the desired physical properties.

In order to increase the nutritional efficiency of the overall feed, it is preferable for the water content to be as low as possible and the protein and fat content to be as high as possible. It is preferable to add fish meal and oil to the outer layer at levels that have no adverse effect on the gelling of the outer layer. Depending on the type of gel used, it is possible to add up to 60 wt. % of fish meal and up to 30 wt. % of oil to the outer layer. It is preferable to add approximately 20 to 30 wt. % of fish meal and 5 to 10 wt. % of fat.

In order to further improve the quality of the gel in the outer layer, it is possible to add additives that are used as improving agents in fish paste products and the like. It is possible to add a starch, a polysaccharide thickener, a soy protein isolate, baking soda, a polyphosphate, egg albumen, transglutaminase, a protease inhibitor, and the like. In particular, in order to enhance the strength of the gel, a thickening agent such as agar, gellan gum, pullulan, a starch, mannan, carrageenan, xanthan gum, locust bean gum, curdlan, pectin, alginic acid or a salt thereof, gum arabic, chitosan, dextrin, or an edible water-soluble cellulose can be blended in the gel as appropriate. However, because many types of farmed fish, including tuna species, cannot digest polysaccharides well, the quantity of polysaccharides should be kept to the minimum quantity required, and the quantity of thickening agent used is preferably 10 wt. % or less, more preferably 5 wt. % or less, and most preferably 1.5 wt. %, of the materials in the outer layer.

As another preferred aspect of the outer layer of the present invention, it was found that a heat-induced gel having a starch as a primary component has excellent resiliency and softness. A gel obtained by adding water to a starch, kneading, and then heating exhibits elasticity, softness, and extensibility. In particular, a variety of processed starches have individual characteristics, and by using two or more types thereof, it is possible to obtain an outer layer having properties such as resiliency, softness, and extensibility. For example, it is possible to combine different types of processed starches, such as a combination of an etherified starch and a phosphoric acid-crosslinked starch. It is possible to obtain an even stronger gel by adding a protein such as gluten or soy bean protein to a starch. It is also possible to use, for example, gluten-containing wheat flour instead of gluten. Other secondary raw materials able to be added include cereal flours such as wheat flour, proteins such as soy bean protein, gluten, or egg albumen, sugars and sugar alcohols such as table sugar or starch syrup, thickening agents such as carrageenan, agar, gellan gum, pullulan, mannan, xanthan gum, locust bean gum, curdlan, pectin, alginic acid or a salt thereof, gum arabic, chitosan, dextrin, or an edible water-soluble cellulose, and salts such as phosphates. For example, by adding wheat flour to a starch, it is possible to impart strength to the outer layer. In addition, by adding a certain quantity of a protein, it is possible to suppress surface stickiness following heating.

The feed of the present invention, in which an inner layer containing mainly fish meal and fish oil is covered by a starch-based heat-induced gel, has an outer layer that exhibits resiliency and softness, and is therefore readily ingested by fish. In terms of production efficiency also, the feed of the present invention has physical properties such as excellent extensibility, and is therefore suitable for covering the inner layer by means of a filling-wrapping machine or an extruder.

From the perspective of the nutritional value of the overall feed, it is preferable to add a large quantity of fish meal or fish oil to the outer layer also. For example, in the case of an outer layer prepared from a heat-induced gel that contains no starch and contains mainly wheat flour, adding a certain quantity or higher of fish meal produces an outer layer which is less soft and more brittle than a dough that contains a starch and which cannot therefore cover the inner layer well, but a heat-induced gel that contains a starch can produce a soft outer layer even if fish meal is contained therein.

The starch used in the present invention is not particularly limited, but can be tapioca starch, wheat starch, potato starch, corn starch, bean starch, and the like, and processed starches obtained by subjecting these starches to etherification, acetylation, acetyl crosslinking, ether crosslinking, phosphoric acid-crosslinking or gelatinized hydroxypropylphosphoric acid-crosslinking are particularly preferred. The feed of the present invention is produced by adding other secondary raw materials such as proteins to these starches, adding water thereto and kneading, covering the inner layer by means of a filling-wrapping machine and the like, and then heating. Alternatively, the feed of the present invention can be produced by feeding the outer layer raw materials and the inner layer raw materials into an extruder having a double nozzle, and blending and heat treating the outer layer raw materials while simultaneously extruding so as to cover the inner layer with the outer layer. The quantity of water added to the raw material such as a starch should be a quantity able to be handled by the filling-wrapping machine or extruder, but approximately 30 to 50 wt. % is appropriate. The heating temperature should be not lower than the temperature at which the starch or added protein gels, and the product temperature should be 60 to 120° C., and preferably approximately 70 to 100° C. Fish oils are easily oxidized, and high temperatures should therefore be avoided.

Moisture in the outer layer of the feed of the present invention, which covers an inner layer of a heat-induced gel of a starch, is approximately 25 to 50 wt. %. When storing for a long period of time in this state, it is possible to store the feed in a refrigerated or frozen state. In addition, by further drying this feed to reduce the moisture to 10 to 20 wt. %, it is possible to obtain a feed having good shelf life. By using super-heated steam in the heating process during production, it is possible to produce a feed having a low initial moisture. When feeding fish with a feed having this moisture, it is possible to immerse the feed in a liquid such as water or sea water so as to cause the feed to absorb water before being fed to the fish. Heat-induced gels of starches have excellent water absorption properties, and by immersing such a gel for approximately 20 to 30 seconds, it is possible to restore the softness to a degree similar to that of an outer layer having moisture of approximately 35 wt. % before drying. By drying the outer layer and also adding additives thereto so as to reduce water activity, it is possible to produce a feed able to be stored for a long period of time at room temperature. The water content is preferably 10 to 20 wt. % and the water activity is preferably 0.8 or lower, and more preferably 0.6 or lower.

According to the present invention, it is possible to provide a feed which has good shelf life and which can rapidly absorb moisture by being immersed in a liquid such as water or sea water before being fed to fish.

Various patterns have been considered for formulating the composition of a starch-containing outer layer. The nutrients and calories required in a feed differ according to the species and growth stage of fish. As the quantity of fish meal or fish oil increases, the outer layer needs to be precisely formulated, but in cases where the quantity of fish meal or fish oil is low, the outer layer can be formulated more freely. In terms of dry product, at least 20 to 80 wt. % of starch is incorporated. In the case of an outer layer in which 25 to 50 wt. % (in terms of dry product) of fish meal is added, it is preferable to add, in terms of dry product, 20 to 65 wt. % of starch, 5 to 20 wt. % of wheat flour, and a total of 5 to 15 wt. % of proteins, oils, thickening agents, salts, and the like. It is preferable to add approximately 1 to 5 wt. % of fish oil, 1 to 2 wt. % of phosphate salts, 1 to 5 wt. % of protein, and 1 to 5 wt. % of thickening agent.

When used as a secondary raw material, wheat flour is preferably strong flour having a high gluten content, but may also be weak flour.

In order to further improve the quality of the outer layer, it is possible to add additives that are used as improving agents in starch-based foods.

The composition of the inner layer contains mainly fish meal and oils, but it is also possible to add other nutrient ingredients known as nutrient ingredients for fish farming, such as vitamins and minerals. In addition, although the inner layer is covered by the outer layer, because it is not desirable for fish meal and liquid oils to leak from the inner layer, it is possible to stabilize the inner layer by blending a polysaccharide or hydrogenated oil or by emulsification. In particular, when producing in a machine, it is preferable for the physical properties of the inner composition to encompass fluidity and physical properties that are appropriate for the machining. Examples of polysaccharides (fat-absorbing agents) include Oil Q (produced by Nippon Starch Chemical Co., Ltd.), and examples of hydrogenated oils include Unishort K (produced by Fuji Oil Co., Ltd.) and New Fujipro SEH (produced by Fuji Oil Co., Ltd.).

Furthermore, raw materials for conventional artificial feeds for farmed fish can be added to the composition of the inner layer. For example, proteins such as live fish, squid meal, krill meal, soy bean lees, and corn gluten meal, oils and fats such as krill oil, whale oil, soy bean oil, corn oil, rape seed oil, and hydrogenated oils, starch-based materials such as starches, wheat flour, rice flour, tapioca powder, and corn powder, alginic acid and salts thereof, polysaccharides such as sodium carboxymethyl cellulose (CMC), guar gum, dextrins, chitosan, curdlan, pectin, carrageenan, mannan, gellan gum, gum arabic, and edible water-soluble celluloses, vitamins, minerals, and the like.

The composition of the inner layer contains 20 to 70 mass % of oils and, in cases where the feed is fed to large farmed fish, the oil content is preferably 30 mass % or higher, more preferably 35 mass % or higher, and most preferably 45 mass % or higher. A high fat content achieves excellent effects in terms of growth and growth efficiency of farmed fish, but if the oil content exceeds 70 mass %, the content of other blending components must fall, meaning that it is difficult to obtain balanced nutrition. Fish oils and other plant-based oils are highly fluid and may be used without further modification, but it is preferable to reduce the fluidity by using oil-absorbing polysaccharides such as Vitacel WF200, Vitacel WF600, or Vitacel WF600/30 (all produced by J. Rettenmaier & Söhne GmbH+Co. KG), Oil Q No. 50 or Oil Q-S (produced by Nippon Starch Chemical Co., Ltd.), or a dextrin such as Pine Flow (produced by Matsutani Chemical Industry Co., Ltd.), oil-absorbing proteins such as fermented soy beans and isoflavones, or hydrogenated oils obtained by hydrogenating oils and fats such as soy bean oil, rape seed oil, or palm oil. Alternatively, it is possible to reduce the fluidity by emulsifying fish oils. However, in view of the digestive properties of fish, the content of these components that reduce fluidity is preferably 10 mass % or lower, and more preferably 5 mass % or lower, of the composition of the inner layer. Fish oils are most preferred as the oil, but it is also possible to replace part of the fish oils with other plant-based oils.

The fish meal, which is an essential component of the inner layer, can be a variety of fish meals or a powder of crustaceans such as krill, which are commonly used as raw materials for feeds for fish farming. The fish meal content is 30 to 70 mass %, preferably 30 mass % or higher, more preferably 35 mass % or higher, and most preferably 45 mass % or higher.

The feed of the present invention is suitable for farmed fish, especially tuna species such as Pacific bluefin tuna (*Thunnus orientalis*), Northern bluefin tuna (*Thunnus thynnus*), Southern bluefin tuna (*Thunnus maccoyii*), Yellowfin tuna (*Thunnus albacares*), and Bigeye tuna (*Thunnus obesus*), but can also be preferably used as a feed for yellowtail species such as Yellowtail (*Seriola quinqueradiata*), Greater amberjack (*Seriola dumerili*), and Yellowtail amberjack (*Seriola lalandi*), salmon species such as Rainbow trout (*Oncorhynchus mykiss*), Coho salmon (*Oncorhynchus kisutch*), and Atlantic salmon (*Salmo salar*), Red seabream (*Pagrus major*), Bastard halibut (*Paralichthys olivaceus*), Tiger puffer (*Takifugu rubripes*), Grouper (*Epinephelinae*), Longtooth grouper (*Epinephelus bruneus*), Japanese seabass (*Lateolabrax japonicus*), Barramundi (*Lates calcarifer*), and the like.

The size of the feed is adjusted according to the size of the fish. The size and shape of the feed should not deviate greatly from the size and shape of fish eaten as bait by fish in the natural world. For tuna species, it is appropriate to use an approximately cylindrical feed having a length of approximately 5 to 20 cm and a cross-sectional diameter of 1 to 5 cm, or a feed having a shape obtained by slightly flattening this cylindrical shape.

In view of the shelf life of the feed of the present invention, the water activity thereof may be adjusted. It is possible to adjust the water activity by adjusting the composition of the inner layer or outer layer. For example, it is possible to reduce the water activity of the composition of the inner layer by adjusting the quantity of water added thereto. In addition, it is possible to adjust the water activity of the composition by adding a water activity-adjusting agent, such as a salt (common salt, sodium malate, sodium lactate, and the like), a sugar (table sugar, lactose, maltose, sorbitol, and the like), a sugar alcohol, an amino acid, a nucleic acid related compound, an organic acid, an alcohol, propylene glycol, glycerin, a starch, or a protein.

The feed including an outer and an inner layer of the present invention may be produced by any method by which it is possible to cover at least the main surface of the inner layer composition with the outer layer composition. When carrying out mass production, it is possible to use, for example, the following method. The composition of the outer layer and that of the inner layer are blended separately, the quantity of each is decided, and the inner layer is covered with the outer layer using a filling-wrapping machine (for example an "AR-800" of the Robo-Seven series manufactured by Kobird Co., Ltd.). Alternatively, the outer layer composition and the inner layer composition are extruded through an extruder having a double nozzle and then cut to an appropriate size. By forming using these methods and then heating, the gel of the outer layer is solidified. The heating method may be a wet type or dry type method. Examples of such methods include steam heating, dielectric heating, and microwave heating. By using an extruder that can simultaneously heat the material being extruded, it is possible to cover the inner layer while heat treating the outer layer.

Covering the main surface means that the outer layer may completely cover the inner layer, or may cover only the side surface of a cylindrical shape and may not cover either of the cut surfaces and, depending on the shape of the feed, the outer layer should cover at least 70% of the surface of the inner layer composition. In cases where the inner layer composition is not completely covered, it is preferable to add an excipient having binding properties, such as a polysaccharide, a hydrogenated oil, or an emulsifier, to the inner layer composition in order to prevent the inner layer from disintegrating.

The present invention will now be explained in greater detail through the use of working examples, but is in no way limited to these working examples.

WORKING EXAMPLES

In the working examples, breaking stress, cohesiveness, and breaking strain were measured using a Rheoner II Creep Meter RE2-3305S manufactured by Yamaden Co., Ltd. The plunger used was a cylinder having a diameter of 8 mm. Breaking stress analysis was carried out using Breaking stress Analysis Windows® software produced by Yamaden Co., Ltd. Cohesiveness analysis was carried out using Texture Analysis Windows® software produced by Yamaden Co., Ltd. Cohesiveness measurements were carried out at a clearance of 30%. The measurement speed was 1 mm/sec. The shape of the sample was a cylinder having a diameter of 23 mm and a height of 20 mm, or a shape similar to this, the cylinder was laid horizontally and the central part of the cylinder was compressed with the plunger. The measurements were carried out after making the temperature of the feed 25° C.

Test Example 1

In order to investigate physical properties of feeds that are preferred by tuna species, feeds and foods having a variety of physical properties were fed to tuna (body weight approximately 2 kg) in a sea cage, and the ways in which the feeds were ingested by the tuna species were observed and given one of five evaluation scores. The evaluation criteria were as follows: 5: Feed eaten without hesitation in the same way as frozen fish given as the normal diet, 4: Feed eaten in moderation with some hesitation, 3: Some feed eaten, but fish did not attempt to eat more than a certain amount, 2: Fish tried to eat a little feed, but ate essentially none, 1: Fish ate no feed whatsoever.

In addition, the physical properties of these feeds and foods were measured. Fresh fish were cut into 2 cm widths and measured after being laid horizontally, and each type of feed, sausage, and kanikama (imitation crab sticks) were measured after being laid horizontally.

The results are shown in Table 1. Because the shapes and sizes of the feeds and foods varied, it was not possible to make exact comparisons therebetween, but it was possible to identify certain trends. It was understood that tuna species like highly soft feeds having physical properties that fell within the following ranges: cohesiveness (30%) of 0.4 or higher and breaking strain of 30 to 60%.

TABLE 1

| Feed or food | Ingestion evaluation | Breaking stress (N/m2) | Cohesiveness (30%) | Breaking strain (%) |
|---|---|---|---|---|
| Mackerel (fresh) | 5 | 4.60E+05 | 0.46 | 35 |
| Horse mackerel (fresh) | 5 | 5.80E+05 | 0.56 | 33 |
| Moist pellet (fish meat:artificial feed = 50:50) | 3 | 6.40E+04 | 0.19 | 16 |
| Moist pellet (fish meat:artificial feed = 90:10) | 3 | 2.90E+03 | 0.4 | 9 |
| EP pellet (Product name: Winglow, produced by Hayashikane Sangyo Co., Ltd.) | 2 | 4.20E+05 | 0.22 | 23 |
| EP pellet (Product name: Wink 14, produced by Nippon Suisan Kaisha, Ltd.) | 2 | 1.80E+06 | 0 | 8 |
| Fish sausage (Product name: Osakana no sausage, produced by Nippon Suisan Kaisha, Ltd.) | 3 | 8.80E+04 | 0.64 | 25 |
| Kanikama (imitation crab sticks) (Product name: Ikihuumi Kamaboko, produced by Nippon Suisan Kaisha, Ltd.) | 4 | 6.00E+04 | 0.81 | 52 |

Test Example 2

Because it was understood from test example 1 that tuna species like the physical properties exhibited by fish paste, a feed having a diameter of 15 mm and a length of 120 mm was prepared from the ingredients shown in table 2 by using surimi as the main raw material in a paste product preparation process and blending fish meal, fish oils, starch, plant proteins, water, vitamins, minerals, and the like, molding into the shape of kanikama (imitation crab sticks), and then steaming so as to form a gel.

The results showed that tuna species ingested this feed well and that the physical properties of this feed fell within ranges that could be described as preferred. The physical properties were measured by laying the feed horizontally and using the aforementioned methods.

TABLE 2

| Ingredient | Percentage |
|---|---|
| Surimi | 50 |
| Water | 18 |
| Salt | 3 |
| Soybean protein (Product name: New Fujipro SEH, produced by Fuji Protein Technologies, Inc.) | 2 |
| Baking soda (Product name: Tansan, acquired from Inoue Seisuke Shoten K.K.) | 0.5 |
| Starch (Product name: Amycol Nyuka, produced by Nippon Starch Chemical Co., Ltd.) | 1 |
| Table sugar | 2.5 |
| Fish meal (Product name: Hamachi Moist ST, produced by Nippon Suisan Kaisha, Ltd.) | 16 |
| Egg albumen K (produced by Kewpie Egg Corporation) | 0.5 |
| Polyphosphate (Product name: Tarinsan, produced by Ueno Fine Chemicals Industry, Ltd.) | 0.5 |
| Gluten (Product name: A-Glu, produced by Glico Foods Co., Ltd.) | 1 |
| Fish oil (Product name: Bonito CD Oil, produced by Nippon Suisan Kaisha, Ltd.) | 5 |

Test Example 3

Next, attempts were made to increase the added quantity of fish oils, which are essential nutrients for tuna species, without altering the physical properties of the feed. 35 wt. % of surimi, 19 wt. % of fish meal, 8 or 15 wt. % of fish oil, 21 or 14 wt. % of water, 3 wt. % of soybean protein, 2 wt. % of starch, 4 wt. % of table sugar, 4 wt. % of salt, 2 wt. % of gluten, 0.5 wt. % of polyphosphate, 0.5 wt. % of baking soda, and 1 wt. % of egg albumen were blended in a food processor, subjected to steam heating, and then cut into samples having a diameter of 2.3 cm and a length of 2.0 cm.

The physical properties of these samples were measured. As shown in table 3, the breaking stress, cohesiveness, and breaking strain deteriorate if the quantity of fish oil is high, and it was understood that by adding more than a certain quantity of fish oil, the preferred physical property ranges could not be achieved.

TABLE 3

| | Breaking stress (N/m$^2$) | Cohesiveness (30%) | Breaking strain (%) |
|---|---|---|---|
| Fish oil 8% | 1.46E+05 | 0.6 | 53 |
| Fish oil 15% | 8.38E+04 | 0.48 | 31 |

Test Example 4: Example in Which Egg Albumen was Used as Protein in the Outer Layer The ingredients shown in table 4 were blended, molded into the shape of a cylinder having a diameter of 2.3 cm and a length of 2.0 cm and then heated for 15 minutes at 90° C. using steam. After being allowed to cool, the breaking stress, cohesiveness, and breaking strain of the product were measured in the same way as mentioned above. The results are shown in table 5 and indicate that the product was suitable for use as the composition of the outer layer of the present invention.

TABLE 4

| Ingredient | Blending proportion (wt. %) |
|---|---|
| Starch (Product name: Miragel 463, produced by Koyo Mercantile Co., Ltd.) | 20 |
| Fish meal (Product name: Hamachi Moist ST, produced by Nippon Suisan Kaisha, Ltd.) | 16 |
| Egg albumen (Product name: Dried Egg Albumen SN, produced by Kewpie Egg Corporation) | 10 |
| Water | 60 |

TABLE 5

| Breaking stress (N/m$^2$) | Cohesiveness (30%) | Breaking strain (%) |
|---|---|---|
| 2.55E+05 | 0.7 | 49.36 |

Test Example 5

In order to find an appropriate blending proportion for the surimi in cases where surimi is used as protein in the outer layer composition, compositions were prepared by blending 45, 7.5, 5, 5, 6.25, 40, 1.25, 5, 0.75, 2.5, 17.5, 1.25, and 1.25 parts by weight respectively of water, salt, New Fujipro SEH, Amycol Nyuka, table sugar, fish meal, egg albumen, a vitamin mix, polyphosphate, gluten, fish oil, transglutaminase, and baking soda with 100, 75, 50, 25, 18.75, 12.5, or 6.25 parts by weight of surimi (formulations 1 to 7). These ingredients were blended, molded into cylindrical shapes having a diameter of 2.3 cm and a length of 2.0 cm, and then heated for 15 minutes at 90° C. using steam. After being allowed to cool, the breaking stress, cohesiveness, and breaking strain of the products were measured in the same way as mentioned above. The results are shown in table 6 and indicate that a composition containing 100 to 50 parts by weight of surimi was suitable for use as the composition of the outer layer of the present invention.

TABLE 6

| | Cohesiveness | Breaking stress | Breaking strain | Remarks |
|---|---|---|---|---|
| Formulation 1 | 0.75 | 1.96E+05 | 50.1 | |
| Formulation 2 | 0.71 | 1.41E+05 | 34 | |
| Formulation 3 | 0.66 | 1.19E+05 | 38.7 | |
| Formulation 4 | 0.44 | 5.77E+04 | 20.6 | |
| Formulation 5 | 0.3 | 3.18E+04 | 13.8 | Surface cracked during heating |
| Formulation 6 | 0.2 | 2.59E+04 | 13.3 | Surface cracked during heating |
| Formulation 7 | | | | Formulation cracked during heating and could not be measured. |

Test Example 6

In order to investigate whether or not differences occur due to different types of fish used in surimi, samples having the same formulation as formulation 2 in test example 5 were prepared by using surimi containing the types of fish shown in table 7, and the breaking stress, cohesiveness, and breaking strain were measured in the same way as mentioned above. As shown in table 7, gels having physical properties that fell within the ranges required for the invention of the present application were obtained using any of the surimi types.

TABLE 7

| | Cohesiveness | Breaking stress | Breaking strain |
|---|---|---|---|
| Alaska pollock (*Theragra chalcogramma*) | 0.49 | 8.95E+04 | 34.3 |
| Alaska pollock (*Theragra chalcogramma*) + Pacific saury (*Cololabis saira*) | 0.54 | 1.12E+05 | 36.2 |
| Chilean horse mackerel meal | 0.56 | 1.28E+05 | 44.7 |
| Peruvian anchovy meal | 0.6 | 1.46E+05 | 53 |
| Mexican Sardinops meal | 0.69 | 1.84E+05 | 37.5 |
| Ecuadorean artificial small fish (horse mackerel, sardine) | 0.7 | 2.21E+05 | 48.7 |

Working Example 1

Feed Having an Outer Layer Containing Surimi

An outer layer composition was prepared by blending 45 wt. % of surimi, 18 wt. % of water, 19 wt. % of fish meal, 9 wt. % of fish oil, 3 wt. % of salt, 0.3 wt. % of gluten, 2.5 wt. % of table sugar, 2.0 wt. % of polysaccharide thickener (Amycol Nyuka, produced by Nippon Starch Chemical Co., Ltd., tapioca starch octynylsuccinate), 2.0 wt. % of isolated soy bean protein powder (New Fujipro SEH, produced by Fuji Oil Co., Ltd.), 1.5 wt. % of vitamin mix, 0.45 wt. % of baking soda, 0.45 wt. % of egg albumen, and 0.25 wt. % of polyphosphate in a silent cutter.

An inner composition was prepared by blending 50 wt. % of fish meal, 41 wt. % of fish oil, 5 wt. % of hydrogenated oil, and 4 wt. % of oil-absorbing dextrin (Oil Q No. 50, produced by Nippon Starch Chemical Co., Ltd.) in a mixer.

The composition for the outer layer and the composition for the inner layer were introduced into a filling-wrapping machine (an "AR-800" of the Robo-Seven series manufactured by Kobird Co., Ltd.) at an outer layer composition:inner layer composition weight ratio of 50:50, and formed so that the outer layer composition covered the periphery of the inner composition and the obtained feed was in the form of a sausage having an average length of 150 mm, the cross-sectional diameter of the outer layer was approximately 20 mm and the cross-sectional diameter of the inner layer part was approximately 15 mm. The feed was then steamed in a steamer for 10 minutes at 90° C., and then cooled.

As comparative example 1, a single layer feed the same size as working example 1 was prepared using the outer layer composition used in working example 1.

As shown in table 8, the ingredient composition of the feed in working example 1 has a far higher protein and fat content than fresh fish or comparative example 1, and is therefore preferred as a feed for fish farming.

TABLE 8

| | Working Example 1 | Comparative Example 1 | Fresh Fish |
|---|---|---|---|
| Crude protein | 30% | 27% | 18% |
| Crude fat | 29% | 8% | 9% |
| Ash content | 6% | 7% | 3% |
| Moisture | 30% | 50% | 70% |

Working Example 2

Method: Using the high-protein, high-fat feed obtained in working example 1, a comparison with raw bait was made in terms of the growth properties of tuna species. Two circular surface preserves having a diameter of 10 m were prepared, and 140 tuna were placed in each and farmed. The average water temperature during the farming period was 25° C. The feed was fed to the fish once per day until the fish were satiated. The amount of feed actually eaten (the amount ingested) was calculated by subtracting the amount of feed remaining from the amount of feed provided.

Result: Throughout the test period, the amount of the feed of working example 1 ingested was 50 to 60 wt. % relative to the amount of raw bait. By calculating the number of calories per unit weight of feed, the number of calories in the feed of working example 1 was 3600 kcal/kg, whereas the raw bait had 1670 kcal/kg. By ingesting a weight of feed equivalent to approximately half the weight of the raw bait, the fish can ingest at least as many calories as from the raw bait. The percentage increase in the weight of the fish in the 40 days from the start of the test was 127% for both the feed of working example 1 and the raw bait. The feed of working example 1 can be expected to bring about similar fish growth as raw bait.

The inner layer to outer layer weight ratio was 50:50 in the feed of working example 1, but by adjusting the weight ratio of the inner layer and outer layer or the compositions thereof, it is possible to adjust the nutrition and calories in the feed. By preparing a feed having more calories and higher nutrition than the formulation in working example 1, it is possible to obtain a feed having higher growth characteristics than raw bait or conventional feeds for tuna species.

Test Example 7

Attempts were made to prepare a feed having the preferred physical properties by using materials other than proteins in the outer layer. Tests were carried out using plant-based raw materials, rather than animal-based raw materials such as surimi, as primary ingredients.

In addition, while investigating a variety of raw materials, an indicator for judging the suitability or unsuitability of these raw materials as the outer layer of the feed of the present invention that is more straightforward than measuring the physical properties of the outer layer in terms of breaking stress, cohesiveness (30%), and breaking strain was investigated, and the following method was found.

Method for Measuring the Physical Properties of the Outer Layer

Outer layer raw materials (total 30 g (including water)) were kneaded, spread on a resin tray having a bottom surface measuring 90×90 mm, formed into a thin layer having a thickness of approximately 3 mm, and then heated for 5 minutes in a steamer at a temperature of 100° C. This thin layer was cut into four rectangular samples, each measuring 80×15×3 mm. These samples were dried for 30 minutes in a drier at a temperature of 105° C. Once cooled, the samples were wrapped in food wrapping film and immersed in a water bath at 25° C. for 30 minutes so as to standardize the temperatures of the samples.

These rectangular samples were gently bent in the middle of the sample, as shown in FIG. 1, and the angle ($\alpha$) at which cracks appeared was determined. A higher angle $\alpha$ indicates greater extensibility and softness and can be said to indicate physical properties that are suitable for the outer layer of the feed of the present invention. An angle $\alpha$ of 90° or higher is suitable for the outer layer of the feed of the present invention.

Raw materials used in the test examples and working examples described below are as follows.

Tapioca starch (etherified): Product name Yuri 8, produced by Matsutani Chemical Industry Co., Ltd./product name G-800, produced by Nippon Starch Chemical Co., Ltd.

Tapioca starch (acetylated): Product name Sakura 2, produced by Matsutani Chemical Industry Co., Ltd.

Tapioca starch (phosphoric acid-crosslinked): Product name Pine Bake CC, produced by Matsutani Chemical Industry Co., Ltd.

Waxy starch (gelatinized): Product name Amycol W, produced by Nippon Starch Chemical Co., Ltd.

Potato starch (etherified): Product name Farinex AG600, produced by Matsutani Chemical Industry Co., Ltd.

Soybean starch (acetyl crosslinked): Product name FPA, produced by Nippon Starch Chemical Co., Ltd.

Soybean protein: Product name New Fujipro SEH, produced by Fuji Oil Co., Ltd.

Wheat flour: Product name Red knight, produced by Nitto Fuji Flour Milling Co., Ltd.

Disodium hydrogen phosphate: Produced by San-Ei Gen F.F.I., Inc.

Test Example 8

Formulation Containing No Starch

In view of formulations used in the food industry, an outer layer was prepared from a formulation using a wheat dough. A rectangular sample was prepared from the formulation shown in table 9 using the method described in test example 7, and the angle $\alpha$ at which cracks occurred was measured and found to be 54°. In addition, even when bent before being dried, cracks occurred before the sample was bent 90°. This sample was poor in terms of softness and extensibility even before being dried, and was therefore not suitable for use as the outer layer of the present invention. In cases where fish meal and fish oil are added, preparing an outer layer from only wheat flour requires the use of a production method in which gluten has a strong effect, such as increasing the kneading time.

TABLE 9

|  | wt. % | In terms of dry product wt. % |
|---|---|---|
| Wheat flour | 23 | 40 |
| Protein (soy bean protein, gluten, dried egg albumen) | 5 | 9 |
| Krill meal | 3 | 5 |
| Salt (phosphate salt) | 0.5 | 1 |
| Polysaccharide thickener | 0.5 | 1 |
| Sugar | 3 | 5 |
| Fish meal | 20 | 35 |
| Fish oil | 2 | 4 |
| Water | 43 | |
| Total | 100 | 100 |

Test Example 9

Formulation Containing Wheat Flour and Starch

Because it was not possible to obtain satisfactory physical properties with only wheat flour in cases where the formulation contained fish meal and fish oil, attempts were made using starch. Rectangular samples were prepared using the formulation in test example 8 as the basic formulation, but in which 35 wt. % of the 40 wt. % (in terms of dry product) of the wheat flour was replaced by the starches shown in table 10, and the angle α, at which cracks occurred when the samples were bent, was measured.

As shown in table 10, adding a variety of starches enables physical properties that are significantly superior in terms of extensibility to cases in which only wheat flour was used.

TABLE 10

|  | Angle α (°) |
|---|---|
| Wheat flour | 54 |
| Tapioca starch (etherified) | 127 |
| Potato starch (etherified) | 110 |
| Waxy starch (gelatinized) | 133 |
| Tapioca starch (acetylated) | 109 |
| Tapioca starch (etherified) + waxy starch (gelatinized) + soy bean starch (acetylated) (weight ratio = 28:5:2) | 141 |

Test Example 10

Starch Formulations

Because using a plurality of starch types produced a preferred effect in test example 9, rectangular samples were prepared in the same way as in test example 9, except that 35 wt. % of the 40 wt. % (in terms of dry product) of the wheat flour used in test example 8 was replaced by the starches shown in table 11, and the angle α, at which cracks occurred when the samples were bent, was measured.

As shown in table 11, it was understood that a synergistic effect was achieved by combining two types of starch rather than using just one type.

TABLE 11

| Tapioca starch (etherified) (wt. %) | Waxy starch (gelatinized) (wt. %) | Angle α (°) |
|---|---|---|
| 35 | 0 | 127 |
| 22 | 13 | 137 |
| 14 | 21 | 147 |
| 8 | 27 | 145 |
| 0 | 35 | 92 |

Test Example 11

Investigation into how Much Fish Meal Can be Added

In order to confirm how much fish meal can be added to the outer layer, rectangular samples were prepared by using the basic formulation shown in table 12 and altering the quantities of fish meal and starch added as shown in table 13, and the angle α at which cracks occurred was measured.

As shown in table 13, if the content of fish meal (in terms of dry product) exceeds 50 wt. %, the angle α at which cracks occur is less than 90°, which is not desirable, and it was thereby confirmed that up to 50 wt. % of fish meal can be added.

TABLE 12

|  | wt. % | In terms of dry product wt. % |
|---|---|---|
| Tapioca starch (etherified) | 30 | 52 |
| Wheat flour | 3 | 5 |
| Protein (soy bean protein) | 2 | 3 |
| Powdered fat | 5 | 9 |
| Salt (phosphate salt) | 0.5 | 1 |
| Polysaccharide thickener | 0.5 | 1 |
| Sugar | 2 | 3 |
| Fish meal | 15 | 26 |
| Water | 42 |  |
| Total | 100 | 100 |

TABLE 13

| Tapioca starch (etherified) (wt. %) | Fish meal (wt. %) | Angle α (°) |
|---|---|---|
| 40 | 38 | 144 |
| 35 | 43 | 110 |
| 24 | 53 | 80 |
| 9 | 69 | 30 |

Experimental Example 12

Addition of Wheat Flour

Based on the results obtained in test example 11, rectangular samples were prepared using the basic formulation shown in table 13 (tapioca starch (etherified):fish meal=24:53), which was thought to be the threshold for fish meal content, but in which the added quantity of wheat flour was increased as shown in table 14, and the angle α at which cracks occurred was measured.

As shown in table 14, the addition of wheat flour improved the angle α at which cracks occurred. In addition, it was confirmed that the addition of wheat flour had the effect of imparting strength to the outer layer.

TABLE 14

| Wheat flour (wt. %) | Angle α (°) |
|---|---|
| 0 | 108 |
| 9 | 135 |
| 13 | 132 |
| 15 | 119 |

Test Example 13

Addition of Phosphate Salt

In the same way as in test example 12, rectangular samples were prepared using the basic formulation shown in table 13 (tapioca starch (etherified): fish meal=24:53), but in which the added quantity of disodium hydrogen phosphate was altered as shown in table 15, and the angle α at which cracks occurred was measured.

As shown in table 15, it was confirmed that adding a phosphate salt improved the angle α at which cracks occurred. It was confirmed that adding a phosphate salt produces physical properties that are excellent in terms of softness and extensibility.

TABLE 15

| Disodium hydrogen phosphate (wt. %) | Angle α (°) |
|---|---|
| 0 | 71 |
| 1 | 92 |
| 2 | 101 |

Test Example 14

Quantity of Starch

Rectangular samples were prepared using the formulation shown in table 16 as a basic formulation, but in which the blending quantities of tapioca starch and wheat flour were adjusted so that the total quantity of starch and the quantity of wheat flour were altered as shown in table 17, and the angle α at which cracks occurred was measured.

As shown in table 17, softness deteriorates if the starch content is low. This showed that in cases in which the fish meal content is 35 wt. %, the starch content is preferably approximately 20 wt. % or higher.

TABLE 16

| | wt. % | In terms of dry product (wt. %) |
|---|---|---|
| Tapioca starch (etherified) | 16 | 28 |
| Waxy starch (gelatinized) | 3 | 5 |
| Soy bean starch (acetyl crosslinked) | 1 | 2 |
| Wheat flour | 3 | 5 |
| Protein (soy bean protein, gluten, dried egg albumen) | 5 | 9 |
| Salt (phosphate salt) | 0.5 | 1 |
| Polysaccharide thickener | 0.5 | 1 |
| Sugar | 3 | 5 |
| Fish meal | 23 | 40 |
| Fish oil | 2 | 4 |
| Water | 43 | |
| Total | 100 | 100 |

TABLE 17

| Total starch content (wt. %) | Wheat flour (wt. %) | Angle α (°) |
|---|---|---|
| 35 | 5 | 141 |
| 30 | 11 | 125 |
| 25 | 16 | 113 |
| 18 | 23 | 87 |

Test Example 15

A rectangular sample was prepared using the formulation shown in table 18, and the angle α at which cracks occurred was measured and found to be 116°. It was confirmed that even if no other secondary raw materials were used, it is possible to obtain an outer layer having sufficient softness. However, because the surface becomes somewhat sticky, it is preferable to add other secondary raw materials for reasons of handleability.

TABLE 18

| | wt. % | In terms of dry product (wt. %) |
|---|---|---|
| Tapioca starch (etherified) | 22 | 38 |
| Waxy starch (gelatinized) | 4 | 7 |
| Wheat flour | 4 | 7 |
| Fish meal | 27 | 48 |
| Water | 43 | |
| Total | 100 | 100 |

Test Example 16

A rectangular sample prepared according to the basic formulation shown in table 16 in test example 14 was dried at 105° C. until the water content in the sample was 20 wt. % or lower. When immersed in water or sea water, this dried rectangular sample rapidly absorbed water and within approximately 30 seconds produced physical properties similar to those exhibited before drying.

Working Example 3

An outer layer composition was prepared by blending 18 wt. % of tapioca starch (etherified starch), 4 wt. % of waxy starch (gelatinized hydroxypropylphosphoric acid-crosslinked starch), 1 wt. % of soy bean starch (acetylated starch), 3 wt. % of isolated soy bean protein powder (New Fujipro SEH, produced by Fuji Oil Co., Ltd.), 3 wt. % of krill meal, 3 wt. % of wheat flour, 1 wt. % of gluten, 0.5 wt. % of carageenan, 0.5 wt. % of disodium hydrogen phosphate, 3 wt. % of egg albumen, 20 wt. % of fish meal, 3 wt. % of starch syrup, 2 wt. % of fish oil, and 40 wt. % of water in a silent cutter.

An inner composition was prepared by blending 60 wt. % of fish meal, 36 wt. % of fish oil, 1.2 wt. % of hydrogenated oil, 3 wt. % of krill meal, 2.5 wt. % of vitamins, 1 wt. % of minerals, 1.2 wt. % of calcium phosphate, and 0.1 wt. % of an organic acid in a mixer.

The composition for the outer layer and the composition for the inner layer were introduced into a filling-wrapping machine (an "AR-800" of the Robo-Seven series manufactured by Kobird Co., Ltd.) at an outer layer composition: inner layer composition weight ratio of 4:6, and formed so that the outer layer composition covered the periphery of the inner layer composition and the obtained feed was in the form of a sausage having an average length of 11 cm, the cross-sectional diameter of the outer layer was approximately 23 mm and the cross-sectional diameter of the inner layer part was approximately 20 mm. The feed was then steamed in a steamer for 100 seconds at 95° C., and then cooled.

Even with an outer layer comprising mainly starch, it was possible to produce a feed having similar surface elasticity and softness to one produced using surimi. Comparing the feed obtained in working example 1 and the feed obtained in this working example, the overall feed obtained in working example 1 contained 34.5 wt. % of fish meal and 25 wt. % of fish oil in terms of wet weight, whereas the feed obtained in this working example contained 44 wt. % of fish meal and 22.4 wt. % of fish oil, but both feeds were evaluated highly in terms of nutritional value. In addition, when fed to tuna species, the feed obtained in this working example was actively ingested by the fish in the same way as rawbait.

INDUSTRIAL APPLICABILITY

According to the present invention, by covering a highly nutritious artificial feed having excellent stability of feed supply and feed shelf life with a heat-induced gel of a protein and/or a starch, it is possible to provide a feed for fish farming having high feed intake and higher nutritional efficiency than conventional feeds.

The invention claimed is:

1. A feed for tuna or yellowtail species comprising:
   an outer layer comprising a heat-induced gel, which comprises at least one material selected from the group consisting of a protein and a starch; and
   an inner layer comprising a composition that comprises nutrient ingredients comprising fish meal and an oil as essential ingredients,
   wherein the heat-induced gel in the outer layer is obtained by forming an outer layer including the at least one material for the heat-induced gel and then heating the outer layer including the at least one material,
   a formulation of the outer layer is different from a formulation of the inner layer, and
   the feed is ingested by at least one fish species selected from the group consisting of tuna species and yellowtail species.

2. The feed according to claim 1, wherein the protein is one material selected from the group consisting of surimi, ground fish meat, krill, gelatin, collagen, gluten, egg albumen, soy bean protein, and a combination of two or more thereof.

3. The feed according to claim 1, wherein the starch comprises at least one material selected from the group consisting of tapioca starch, wheat starch, potato starch, corn starch, bean starch, waxy corn starch, or a processed product thereof.

4. The feed according to claim 1, wherein the outer layer further comprises at least one material selected from the group consisting of fish meal and an oil.

5. The feed according to claim 1, wherein moisture of the outer layer is in a range from 20 to 50 wt. %.

6. The feed according to claim 1,
   wherein the outer layer is a composition having physical properties whereby cracks do not occur when a rectangular slice sample of the outer layer, which has a thickness of 3 mm and is dried for 30 minutes at a temperature of 105° C., is bent to an angle of at least 90° to be folded in half.

7. The feed according to claim 1, wherein the inner layer composition comprises the fish meal in an amount from 30 to 70 wt. % and the oil in an amount from 30 to 70 wt. %.

8. The feed according to claim 1, wherein the inner layer composition further comprise at least one material selected from the group consisting of a polysaccharide, a hydrogenated oil, and an emulsifier.

9. The feed according to claim 1, which is a feed for tuna species.

10. A feed for tuna or yellowtail species, wherein moisture of the outer layer of the feed described in claim 1 is in a range from 10 to 20 wt. %.

11. The feed according to claim 1, wherein the heat-induced gel in the outer layer is obtained by heating the at least one material at 60° C. or higher.

12. The feed according to claim 1, wherein the heat-induced gel in the outer layer comprises a starch that has been heated with water at a temperature of 60° C. or higher, as the starch for the heat-induced gel.

13. The feed according to claim 1, wherein the heat-induced gel in the outer layer comprises two or more starches selected from the group consisting of tapioca starch, wheat starch, potato starch, corn starch, bean starch, waxy corn starch, or a processed product thereof.

14. The feed according to claim 1, wherein the heat-induced gel in the outer layer comprises the protein that has been heated at a temperature of 80-90° C. for 10 minutes or longer.

15. The feed according to claim 1, wherein the feed is ingested actively by the fish in a same way as the fish ingests raw baits.

16. The feed according to claim 15, wherein the fish is the tuna species.

* * * * *